(12) United States Patent
Shen

(10) Patent No.: US 7,714,092 B2
(45) Date of Patent: May 11, 2010

(54) COMPOSITION, PREPARATION OF POLYCARBOSILANES AND THEIR USES

(75) Inventor: Qionghua Shen, Latham, NY (US)

(73) Assignee: Starfire Systems, Inc., Malta, NY (US)

( * ) Notice: Subject to any disclaimer, the term of this patent is extended or adjusted under 35 U.S.C. 154(b) by 682 days.

(21) Appl. No.: 11/612,890

(22) Filed: Dec. 19, 2006

(65) Prior Publication Data

US 2007/0167599 A1    Jul. 19, 2007

Related U.S. Application Data

(60) Provisional application No. 60/758,711, filed on Jan. 13, 2006.

(51) Int. Cl.
*C08G 77/60* (2006.01)
(52) U.S. Cl. ............... 528/35; 528/14; 528/42
(58) Field of Classification Search .......... None
See application file for complete search history.

(56) References Cited

U.S. PATENT DOCUMENTS

| | | | |
|---|---|---|---|
| 4,100,233 A | 7/1978 | Yajima et al. | |
| 4,657,991 A | 4/1987 | Takamizawa et al. | |
| 4,826,892 A | 5/1989 | Shimada et al. | |
| 5,153,295 A | 10/1992 | Whitmarsh et al. | |
| 5,204,434 A | 4/1993 | Sartori et al. | |
| 5,270,429 A | 12/1993 | Michalczyk | |
| 5,620,934 A | 4/1997 | Itoh et al. | |
| 2007/0021580 A1* | 1/2007 | Nakagawa et al. | ............ 528/34 |

* cited by examiner

*Primary Examiner*—Marc S Zimmer
(74) *Attorney, Agent, or Firm*—Hoffman Warnick LLC

(57) ABSTRACT

The invention provides branched copolymers as precursors for preparing silicon carbide (SiC) ceramics represented by the general formulae:

$$[Si(\sim)RC(\sim)H]_{xn}[SiR_1R_2CH_2]_{yn}, \quad \text{Formula Type-I}$$

wherein n is the degree of polymerization, $0.1 \leq x < 0.8$, $0.2 \leq y < 0.9$ and $x+y=1$; and R=methyl or H, $R_1$ and $R_2$ are randomly composed of hydrogen (H), allyl, methyl (Me), phenyl (Ph), propargyl or vinyl. Another branched copolymer is represented by the general formula:

$$[Si(\sim)RC(\sim)H]_{xn}[SiR_1R_2CH_2]_{yn}[SiR_3R_4CH_2]_{zn} \quad \text{Formula Type-II}$$

wherein n is the degree of polymerization, $0.1 \leq x < 0.8$, $0 \leq y < 0.8$, $0.2 \leq z < 0.8$ and $x+y+z=1$; and R=methyl or H, $R_1$ and $R_2$ are randomly composed of hydrogen (H), methyl (Me) and phenyl; $R_3$ and $R_4$ are randomly composed of H, allyl, methyl, phenyl (Ph), propargyl, and vinyl. The invention also provides methods for the preparation of such branched copolymers.

37 Claims, No Drawings

COMPOSITION, PREPARATION OF POLYCARBOSILANES AND THEIR USES

RELATED APPLICATION

The present application claims the benefit of co-pending provisional application No. 60/758,711, filed on Jan. 13, 2006, which is hereby incorporated herein.

BACKGROUND OF THE INVENTION

1. Field of the Invention

Silicon carbide (SiC) is a well-recognized ceramic material with a wide variety of applications because of its low density, high strength, high thermal stability, and high resistance to oxidation and corrosion. These characteristics make SiC a suitable material for components in electronic devices and for potentially replacing metal in engine parts. Silicon carbide is also suitable for use in low friction bearings, thermal and environmental barrier coatings, and wear resistant components (e.g. brakes).

While it is desirable to replace existing materials with SiC in most industries, the hardness and non-melting characteristics of this ceramic material makes it difficult to process by conventional methods. One solution to this problem is to use polycarbosilances as precursors of SiC because of their solubility in organic solvents, moldablity, spinnablity, cross-linkablity and high yield on pyrolysis.

2. Background Art

The first commercial polycarbosilane which was used as a precursor of SiC was disclosed by Yajima et al. in U.S. Pat. No. 4,100,233. This precursor of SiC was prepared by coupling dimethyldichlorosilane with sodium in toluene, followed by a rearrangement reaction of poly(dimethylsilane) in an autoclave at high temperature. The resultant polymer has a major repeat unit, $[SiMeHCH_2]$ and can only exist as solid form due to some un-converted Si—Si bond. However, the use of sodium and high temperature treatment tend to incur high manufacturing cost which diminishes the viability of this preparation method.

A polycarbosilane disclosed by Yajima has been used to prepare Nicalon fiber via a melt spinning process. An oxygen curing process for retaining the shape of the Nicalon fiber occurs before pyrolysis. This oxygen curing step is necessary to supplement the lack of efficient cross-linkable functional groups in the Yajima polycarbosilane. However, excess oxygen in the SiC is created after pyrolysis. In addition to the excess oxygen, excess carbon is also generated after pyrolysis. The excess carbon is due to a carbon to silicon ratio of 2:1 in the polycarbosilane precursor. The residual oxygen and excess carbon have negative effects on the long-term stability of ceramic fibers like Nicalon fiber.

Another disclosure (U.S. Pat. No. 4,826,892) by Shimada et al. teaches a method of making a phenyl substituted polycarbosilane or polycarbosilastyrene, similar to the Yajima polymer. While the fiber made from this precursor contains less oxygen, the cost of manufacturing this polymer is comparable to Yajima's polymer.

Whitmarsh et al. (U.S. Pat. No. 5,153,295) disclosed a branched polycarbosilane, $[SiH_2CH_2]_n$, prepared by Grignard reaction of chloromethyltrichlorosilane in ether, followed by reduction with lithium aluminum hydride ($LiAlH_4$). While this polycarbosilane has a high SiC yield, due to a 1:1 silicon:carbon ratio, it can only exist as a liquid at room temperature due to its low glass transition temperature ($T_G$).

U.S. Pat. No. 5,270,429 by Michalczyk disclosed an extensively branched chloropolycarbosilane having a formula: $[CH(Cl)_zSiMe(H)_x]H_y$. The extensive branching in this polycarbosilane is a steric hindrance for the preparation its copolymer with (dichloromethyl)methyldichlorosilane. This particular characteristic causes incomplete coupling of all chlorine atoms during a Grignard reaction of monomer, (dichloromethyl)methyldichlorosilane. Excess chlorine from incomplete coupling with magnesium (Mg) in the Grignard reaction is not desired in SiC. In comparison, the use of sodium (Na) in a corresponding Wurtz coupling reaction drives the coupling to completion leaving no uncoupled chlorine. However, the complete coupling of chlorine produces an insoluble solid as end polymer, $[CHSiMe]n$, with limited use because processing such an insoluble solid as a precursor is difficult and costly.

In view of the foregoing, a need exists to overcome one or more of the deficiencies in the related art.

BRIEF SUMMARY OF THE INVENTION

The present invention provides two types of branched copolymers as precursors for preparing silicon carbide (SiC) ceramics. Preparation processes of the two types of copolymers are also disclosed. The preparation processes include a one-step reaction process, a two-step reaction process and a three-step reaction process. The composition includes two types of branched copolymers.

In a first aspect of the invention, a first of the two types of branched copolymers is a polycarbosilane, having the general average formula:

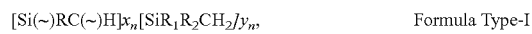

Formula Type-I where ~ represents branched chain, n is a degree of polymerization, $0.1 \leq x < 0.8$, $0.2 \leq y < 0.9$ and $x+y=1$, R is methyl or hydrogen, $R_1$ and $R_2$ are randomly composed of H, allyl, methyl, phenyl, propargyl, and vinyl groups. Actual structures of polymers derived from such average formulae are highly branched. Details of such exemplary branched polymers are disclosed in U.S. Pat. No. 5,153,295 by Whitmarsh, incorporated herein by reference.

A second aspect of the invention provides a second of the two types of polycarbosilane, having the general formula:

Formula Type-II where ~ represents branched chain, n is the degree of polymerization, $0.1 \leq x < 0.8$, $0 \leq y < 0.8$, $0.2 \leq z < 0.8$ and $x+y+z=1$, R is methyl or hydrogen, $R_1$ and $R_2$ are randomly composed of hydrogen, methyl and phenyl groups, $R_3$ and $R_4$ are randomly composed of allyl, methyl, phenyl, propargyl, and vinyl groups.

In a third aspect of the invention, a method for preparing carbosilane copolymers having both general formula I and II: the method comprising a one-step reaction in an organic solvent between halocarbosilane co-monomers in the presence of magnesium, wherein the co-monomers have the general formula:

where X is a halogen, R is a monovalent hydrocarbon, $1 \leq p \leq 3$, $0 \leq q \leq 2$, $1 \leq r \leq 2$ and $1 \leq s \leq 2$.

Another aspect of the invention provides a method for preparing the carbosilane copolymers having both general formula I and II:

the method comprising a two-step reaction including a Grignard reaction between halocarbosilane co-monomers and a reduction reaction to replace halogens or methoxy groups in the copolymer, the halocarbosilane co-monomers having the general formula:

$$X_pR_qSiCH_rX_s$$

where X is a halogen, R is a monovalent hydrocarbon, $1 \leq p \leq 3$, $0 \leq q \leq 2$, $1 \leq r \leq 2$ and $1 \leq s \leq 2$.

Yet another aspect of the invention presents a method for preparing polycarbosilanes having both general formula I and II, the method comprising a three-step reaction including: partial methoxylation of a trichlorosilane, Grignard reaction of the partially methoxylated trichlorosilane and reduction thereof.

The illustrative aspects of the present invention are designed to solve one or more of the problems herein described and/or one or more other problems not discussed.

DETAILED DESCRIPTION OF THE INVENTION

The invention provides branched carbosilane copolymers, as well as methods for preparing and using the same. The branched copolymers have recurring units represented by the general average formula:

$$[Si(\sim)RC(\sim)H]_{xn}[SiR_1R_2]_{yn} \quad \text{Formula Type-I}$$

where n is the degree of polymerization;
~ represents branched chain;
$0.1 \leq x \leq 0.8$, $0.2 \leq y \leq 0.9$ and $x+y=1$;
R may represent hydrogen (H) or methyl (Me);
Both $R_1$ and $R_2$ may represent: hydrogen (H), allyl, methyl (Me), phenyl (Ph), propargyl or vinyl;
Or
$R_1$ and $R_2$ may each represent: hydrogen (H), allyl, methyl (Me), phenyl (Ph), propargyl or vinyl
and $$[Si(\sim)RC(\sim)H]_{xn}[SiR_1R_2CH_2]_{yn}[SiR_3R_4CH_2]_{zn} \quad \text{Formula Type-II}$$

where n is the degree of polymerization;
~ represents branched chain;
$0.1 \leq x \leq 0.8$, $0 \leq y \leq 0.8$, $0.2 \leq z \leq 0.8$ and $x+y+z=1$;
R may be methyl (Me) or hydrogen (H);
Both $R_1$ and $R_2$ may be hydrogen (H) or methyl (Me) or phenyl;
$R_3$ and $R_4$ may each represent hydrogen (H), allyl, methyl (Me), phenyl (Ph), propargyl or vinyl.
Alternatively,
$R_1$ may represent hydrogen (H), $R_2$ may represent methyl (Me) or phenyl;
$R_3$ and $R_4$ may each represent: hydrogen (H), allyl, methyl (Me), phenyl (Ph), propargyl or vinyl.

The unit ratio of x:y:z and the size of the branching/side group determines whether the polymer is a liquid or solid, where $0.1 \leq x \leq 0.8$, $0 \leq y \leq 0.8$, $0.2 \leq z \leq 0.8$, and the sum, $x+y+z=1$. The liquid polymer may be used as a precursor for the impregnation of ceramic matrix composite (CMC) components while the solid polymer can be used as a precursor for silicon carbide (SiC) fiber or for forming prepregs for various CMC components via hot melt process. The polymers may be prepared by one or more of three methods, each discussed below.

One-Step Method

The one-step method includes a Grignard reaction where co-monomers of halomethylsilanes, such as dichloromethylmethyldichlorosilane with chloromethyldimethylchlorisl-nae, or chloromethylemthyldichloroislane, etc., are mixed and added to magnesium (Mg) in an organic solvent, tetrahydrofuran (THF), to form a Grignard intermediate —CHMgX, where X represent a halogen such as chlorine (Cl) or bromine (Br). The Grignard intermediate couples with Si—X groups in the co-monomers to form Si—C bond, leading to the formation of chain structure for polymers. Complete formation of Grignard intermediates in all dichloromethyl groups (—CHCl₂) of the dichloromethylmethyldichlorosilane in the presence of co-monomers, mono-chloromethylsilanes, is achievable due to reduced steric hindrance as compared to the use of the single monomer dichloromethylmethyldichlorosilane ($Cl_2MeSiCHCl_2$). This is because the mono-chloromethylsilanes decrease the branching in the polymer structure reducing steric hindrance to allow the dichloromethyl groups to access Mg and form the Grignard intermediate. The reduced steric hindrance also facilitates complete coupling of all Grignard intermediates with the Si—X groups. The temperature of the Grignard reaction may range from approximately 50° C. to approximately 74° C.

The use of co-monomer, dichloromethylmethyldichlorosilane, in this one-step method yields resultant copolymers with higher molecular weights as compared to resultant homo-polymers from a direct Grignard reaction of single monomer, mono-chloromethylsilanes. The higher molecular weight of the copolymers is due to the formation of branched chains from the second chlorine of the dichloromethyl group in dichloromethylmethyldichlorosilane. The branched chains have similar Si—C linkage as the main chain. Equation 1 below illustrates a mixture of co-monomers, (dichloromethyl)methyldichlorolsilane ($Cl_2SiMeCHCl_2$) and (chloromethyl)dimethylchlorosilane ($ClMe_2SiCH_2Cl$), reacting with Mg in THF to produce copolymers with a Type-I formula, $[Si(\sim)MeC(\sim)H]_{xn}[SiMe_2CH_2]_{yn}$.

$$Cl_2SiMeCHCl_2 + ClMe_2SiCH_2Cl + Mg/THF \Rightarrow [Si(\sim)MeC(\sim)H]_{xn}[SiMe_2CH_2]_{yn} \quad \text{Equation 1}$$

where n is the degree of polymerization;
~ represents branched chain;
$0.1 \leq x < 0.8$, $0.2 \leq y < 0.9$ and $x+y=1$.

Upon pyrolysis to 1000° C. under inert gas, the ceramic yield of these copolymers from equation 1 ranges from 20 to 35% when the ratio of x/y in $[Si(\sim)MeC(\sim)H]_{xn}[SiMe_2CH_2]_{yn}$ ranges from 1:1 to 2:1. This is much higher than the corresponding homopolymer, $[SiMe_2CH_2]_n$, prepared from $ClMe_2SiCH_2Cl$, which has less than 5% ceramic yield on pyrolysis. The higher ceramic yield for the copolymers is due to the existence of the branched structures.

The homo-polymer $[CH(Cl)_zSiMe(H)_x]H_y$, made from a single monomer $Cl_2SiMeCHCl_2$ has a higher ceramic yield as reported in U.S. Pat. No. 5,270,429, but a high proportion of the ceramic from by this method has un-reacted chlorine even after reduction by lithium aluminum hydride, $LiAlH_4$. The use of a large amount of $LiAlH_4$ also adds substantial cost to the production of homo-polymer $[CH(Cl)_zSiMe(H)_x]H_y$. In contrast, the current one-step method for making copolymers provides a moderate ceramic yield without using $LiAlH_4$. Further examples of this one-step process are provided below.

The one-step method may be used to prepare copolymers with organic functional groups like allyl, phenyl, etc. through the use of the corresponding organic Grignard intermediates that couple with halosilane (Si—X) or methoxy silane (Si—OMe) groups. A complete substitution of the Si—X or Si—OMe groups can be achieved by utilizing organic halides in excess and/or in the presence of catalysts such as CuCN and NaSCN. Equation 2, below, illustrates a mixture of co-monomers, (dichloromethyl)methyldichlorolsilane ($Cl_2SiMeCHCl_2$) and (chloromethyl)dichloromethylsilane ($Cl_2MeSiCH_2Cl$), reacting with Mg in THF in the presence of allylchloride to produce allyl-substituted copolymers with a Type-I formula, $[Si(\sim)MeC(\sim)H]_{xn}[SiMe(Allyl)CH_2]_{yn}$.

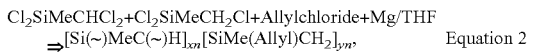
Equation 2 where n is the degree of polymerization;
$\sim$ represents branched chain;
$0.1 \leq x < 0.8$, $0.2 \leq y < 0.9$ and $x+y=1$.

The Grignard coupling reaction of $Cl_2SiMeCHCl_2$ and $Cl_2SiMeCH_2Cl$ in Equation 2 is conducted in the same way as for the copolymers in Equation 1. The co-monomer $Cl_2MeSiCH_2Cl$ in Equation 2 carries two chlorines (Cl) on silicon (Si). After coupling with a Grignard intermediate, CHMgCl, one Cl remains un-reacted, generating a chloro substituted polymer $[Si(\sim)MeC(\sim)H]_{xn}[SiMe(Cl)CH_2]_{yn}$ first. The chloro polymer is not separated from the reaction flask. Allylchloride is then added to the chloro substituted polymer solution to form allylmagnesium chloride, which subsequently couples with all the chlorosilane (SiCl) groups to form the desired copolymers. Although the silanes and allylchloride are added separately, only one work-up process is required to isolate the polymers.

Equation 3 illustrates preparation of phenyl-substituted copolymers, which is essentially the same as the preparation of the allyl-substituted copolymer in Equation 2. The phenyl-substituted co-polymers have a Type-I formula.

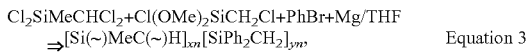
Equation 3 wherein n is the degree of polymerization;
$\sim$ represents branched chain;
$0.1 \leq x < 0.8$, $0.2 \leq y < 0.9$ and $x+y=1$.

Copolymers composed of more than two monomers can also be prepared in the same one-step method. As shown in equation 4, a reaction of the monomers: $Cl_2SiMeCHCl_2$, $Cl_2SiMeCH_2Cl$, and $ClMe_2SiCH_2Cl$ can lead to the formation of copolymers with a Type-II formula, $[Si(\sim)MeC(\sim)H]_{xn}[SiMe(allyl)CH_2]_{yn}[SiMe_2CH_2]_{zn}$.

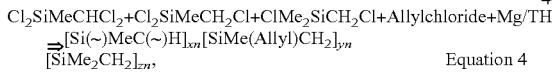
Equation 4 wherein n is the degree of polymerization;
$\sim$ represents branched chain;
$0.1 \leq x < 0.8$, $0 \leq y < 0.8$, $0.2 \leq z < 0.8$ and $x+y+z=1$.

Two-Step Method

The second method is a two-step method that includes a Grignard reaction, as discussed in the one-step process for producing Grignard intermediates, and a reduction reaction using lithium-aluminum hydride ($LiAlH_4$) for converting unreacted Si—Cl or Si—OMe groups to Si—H groups.

Equation 5 and 6 illustrate the Grignard reaction between co-monomers $Cl_2SiMeCHCl_2$ and $Cl_2SiMeCH_2Cl$ to form copolymer with Type-II formula. The copolymer generated initially is a chloro copolymer, which is similar to Equation 2, having a formula: $[SiMe(\sim)CH(\sim)]_{xn}[SiMe(Cl)CH_2]_{yn}$. The Si—Cl groups in the chloro copolymer can be partially substituted by functional groups like: allyl, phenyl, propargyl, or vinyl via a coupling reaction of corresponding Grignard intermediates, RMgX, which can be prepared from the corresponding organic chloride or bromide in situ. When part of the chloro group in $[SiMe(\sim)CH(\sim)]_{xn}[SiMe(Cl)CH_2]_{yn}$ is replaced by allyl group, the resultant copolymer has a formula, $[Si(\sim)MeC(\sim)H]_{xn}[SiMe(Cl)CH_2]_{yn}[SiMe(Allyl)CH_2]_{zn}$. The unreacted Si—Cl groups that remain can be reduced by $LiAlH_4$ to form Si—H groups. The Si—H and C—C multiple bonds in allyl, propargyl and vinyl are typical cross-linking groups, which are useful for curing the copolymers when necessary.

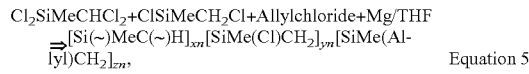
Equation 5 wherein n is the degree of polymerization;
$\sim$ represents branched chain;
$0.1 \leq x < 0.8$, $0.2 \leq y < 0.9$, $0 \leq z < 0.8$ and $x+y+z=1$ Equation 6 illustrates the reduction reaction of the Si—Cl group in the co-polymer from the Grignard reaction from Equation 5.

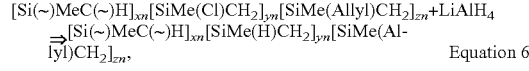
Equation 6 wherein n is the degree of polymerization;
$\sim$ represents branched chain
$0.2 \leq x < 0.8$, $0.2 \leq y < 0.9$, $0 \leq z < 0.8$ and $x+y+z=1$.

Copolymers with Type-I formula can also be prepared by this two-step method. Equation 7 and 8 illustrate a Grignard reaction and a reduction reaction, respectively, to produce a hydrogen substituted copolymer $[Si(\sim)MeC(\sim)H]_{xn}[SiH_2CH_2]_{yn}$.

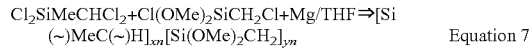
Equation 7 wherein n is the degree of polymerization;
$\sim$ represents branched chain;
$0.1 \leq x < 0.8$, $0.2 \leq y < 0.9$, and $x+y=1$

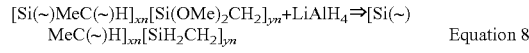
Equation 8 wherein n is the degree of polymerization;
$\sim$ represents branched chain;
$0.1 \leq x < 0.8$, $0.2 \leq y < 0.9$, and $x+y=1$.

Copolymers consisting of more than two monomers can also be prepared with the two-step process. Equation 9 illustrates the use of three co-monomers: (dichloromethyl)dichloromethylsilane ($Cl_2SiMeCHCl_2$), (chloromethyl)dichloromethylsilane ($Cl_2SiMeCH_2Cl$) and (chloromethyl) chlorodimethylsilane ($ClMe_2SiCH_2Cl$) in a Grignard reaction (Equation 9) that leads to the formation of copolymers having a Type-II formula: $[Si(\sim)MeC(\sim)H]_{xn}[SiMe(Cl)CH_2]_{yn}[SiMe_2CH_2]_{zn}$.

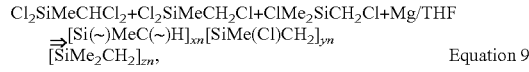
Equation 9 wherein n is the degree of polymerization; $\sim$ represents branched chain,
$0.1 \leq x < 0.8$, $0 \leq y < 0.8$, $0.2 \leq z < 0.8$ and $x+y+z=1$.

These Si—Cl containing polymers may be reduced to corresponding Si—H containing polymers with Type-II formula in a reduction reaction (Equation 10) using $LiAlH_4$.

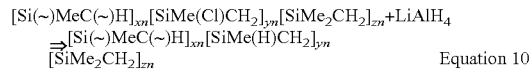
Equation 10 wherein n is the degree of polymerization;
$\sim$ represents branched chain;
$0.1 \leq x < 0.8$, $0 \leq y < 0.8$, $0.2 \leq z < 0.8$ and $x+y+z=1$ Three-Step Method The Grignard reaction is not applicable where a trichlorosilane is used as a co-monomer because the reaction will substantially cleave the organic solvent, THF, which may lead to incorporation of oxygen and excess carbon in the end polymer. To overcome this side reaction of THF cleavage, partial methoxylation of a co-monomer, for example, a haloalkylhalosilane, is devised as an initial/first step of a three-step method. The second step of the three-step method is a Grignard reaction of the partially methoxylated co-monomers in THF, and ending with reduction of the polymer by LiAlH$_4$ as the third of the three-step method. Each step of the three-step method is illustrated below in Equations 11-14.

Step 1—Partial Methoxylation

For a co-monomer having a high proportion of halogen atoms, for example, the haloalkylhalosilane may be chloromethyltrichlorosilane, the chlorine atoms bonded to the silicon atom may be partially substituted with methoxy groups at room temperature.

$$Cl_3SiCH_2Cl + mMeOH \Rightarrow Cl_{3-m}(OMe)_m SiCH_2Cl, \quad \text{Equation 11}$$

where $1.5 \leq m \leq 2.5$.

Alternatively, (dichloromethyl)methyldichlorosilane may also be partially methoxylated, as shown in Equation 12 below.

$$Cl_2CHMeSiCl_2 + pMeOH \Rightarrow Cl_2CHMeSi(OMe)_p Cl_{2-p}, \quad \text{Equation 12}$$

where $0 < p \leq 1$.

The partially methoxylated haloalkylhalosilane co-monomers are then reacted with magnesium (Mg), in an organic solvent like tetrahydrofuran (THF) at a temperature ranging from approximately 68° C. to approximately 74° C.

Step 2—Grignard Reaction

As shown in Equation 13, the Grignard reaction from the partially methoxylated chloromethyltrichlorosilane and the partially methoxylated (dichloromethyl)methyldichlorosilane produces methoxylated copolymers with a formula: [Si(~)MeCH(~)]$_{xn}$[Si(OMe)$_2$CH$_2$]$_{yn}$[Si(OMe)RCH$_2$]$_{zn}$. A very strong exothermic reaction is always observed right after the completion of the addition of the methoxylated monomers. After the strong exothermic reaction, the organic halides are added to continue the Grignard reaction, which leads to the incorporation of organic groups such as, allyl, phenyl, propargyl and vinyl. The organic halides may include: allyl halide, phenyl halide, vinyl halide and propargyl halide.

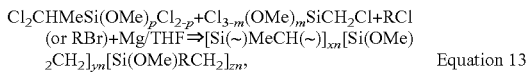

$$Cl_2CHMeSi(OMe)_p Cl_{2-p} + Cl_{3-m}(OMe)_m SiCH_2Cl + RCl \text{ (or RBr)} + Mg/THF \Rightarrow [Si(\sim)MeCH(\sim)]_{xn}[Si(OMe)_2CH_2]_{yn}[Si(OMe)RCH_2]_{zn}, \quad \text{Equation 13}$$

where n is the degree of polymerization;
~ represents branched chain;
R may be allyl, phenyl, propargyl and vinyl;
$1.5 \leq m \leq 2.5$; $0 < p \leq 1$;
$0.1 \leq x < 0.8$, $0 \leq y < 0.8$, $0.2 \leq z < 0.8$ and $x+y+z=1$.

Alternatively, the partially methoxylated chloromethyltrichlorosilane may be mixed with non-partially methoxylatyed (dichloromethyl)methyldichlorosilane as shown in Equation 14. It is observed that no exothermic reaction occurs in the Grignard reaction when non-partially methoxylatyed (dichloromethyl)methyldichlorosilane is used.

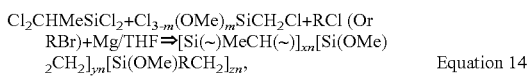

$$Cl_2CHMeSiCl_2 + Cl_{3-m}(OMe)_m SiCH_2Cl + RCl \text{ (Or RBr)} + Mg/THF \Rightarrow [Si(\sim)MeCH(\sim)]_{xn}[Si(OMe)_2CH_2]_{yn}[Si(OMe)RCH_2]_{zn}, \quad \text{Equation 14}$$

where n is the degree of polymerization;
~ represents branched chain;
$1.5 \leq m \leq 2.5$; $0 < p \leq 1$;
R may be allyl, phenyl, propargyl and vinyl;
$0.1 \leq x < 0.8$, $0 \leq y < 0.8$, $0.2 \leq z < 0.8$ and $x+y+z=1$.

Catalysts, like zinc (Zn), CuCN, or NaSCN, may be added in all the Grignard reactions above.

Step 3—Reduction Reaction

The last step of the three-step method is a reduction reaction using lithium aluminum hydride (LiAlH$_4$) at temperature ranging between approximately 50° C. and approximately 70° C. in tetrahydrofuran (THF). The reduction reaction of the polymers formed from the Grignard reactions in Equation 13 and Equation 14 can be conducted in the same way as shown Equation 15. It is observed that the non-methoxylated (dichloromethyl)methyldichlorosilane tend to form polymers that are high viscous liquids or solids. While, the methoxylated (dichloromethyl)methyldichlorosilane allows the corresponding polymers to be formed in low to high viscous liquid.

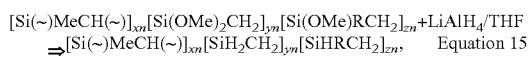

$$[Si(\sim)MeCH(\sim)]_{xn}[Si(OMe)_2CH_2]_{yn}[Si(OMe)RCH_2]_{zn} + LiAlH_4/THF \Rightarrow [Si(\sim)MeCH(\sim)]_{xn}[SiH_2CH_2]_{yn}[SiHRCH_2]_{zn}, \quad \text{Equation 15}$$

where n is the degree of polymerization,
~ represents branched chain;
R may be allyl, phenyl, propargyl and vinyl,
$0.1 \leq x < 0.8$, $0 \leq y < 0.8$, $0.2 \leq z < 0.8$ and $x+y+z=1$.

The C—C multiple bonds in the organic group R are useful for curing the copolymer at low temperature via hydrosilylation reaction with Si—H groups. Upon pyrolysis to 1000° C. under inert gas, the ceramic yield of the copolymers prepared from the three-step reactions method is typically in the range of 60 to 75%. This is consistent with copolymers that are highly branched and contain significantly greater Si—H groups than polymers made from the 1-step or 2-step process. The resultant SiC ceramic derived from the pyrolysis of these copolymers has excellent oxidation stability under high temperatures. Fibers can be drawn from all the solid polymers. The copolymers are shown to have molecular weights (Mw) in the range of approximately 300 to approximately 250,000 Daltons through gel permeation chromatography (GPC) based on the standards of polystyrene in THF solution.

As pointed above, copolymers of either Type-I or Type-II formula may be prepared by any of the above three methods. The following paragraphs details the type of apparatus for conducting partial methoxylation reaction, Grignard reaction and reduction reaction.

General Apparatus for Partial Methoxylation Reaction

A 5-liter three-neck-round-bottomed flask is used for the partial methoxylation reaction. The flask is set up with a pressure-equalizing dropping funnel and a reflux condenser. The dropping funnel has a top connected to a nitrogen gas inlet to keep the flask continuously flushed with nitrogen gas throughout the reaction. The reflux condenser is connected to tubing positioned over a large plastic container of water into which by-product hydrogen chloride (HCl) gas is absorbed. A magnetic stirrer is placed in the flask to stir the reactants in the flask.

General Apparatus for Grignard Coupling Reaction

A 12-liter three-neck round bottom flask is used for the Grignard coupling reaction. The flask is fitted with a dropping funnel, a mechanical stirrer, and a reflux condenser. The reflux condenser is fitted with a gas inlet for a supply of dry nitrogen.

General Apparatus for Reduction Reaction

The reduction reaction occurs in the same apparatus set up as that of the Grignard coupling reaction.

The following examples illustrate in detail the preparation process using one of the methods (i.e., one-step, two-step or three-step) discussed above with the respective apparatus set-up for the respective reaction.

EXAMPLE 1

One-Step Method for Forming a Type I (Solid) Copolymer Using 2 Monomers 216 g (8.89 mols) of magnesium powder (approximately 50 mesh) and 250 mL of anhydrous THF are placed in the 12-liter three-neck round bottom flask equipped for the Grignard reaction. 215 g (1.50 mols) of $ClMe_2SiCH_2Cl$, 595 g (3.00 mols) of $Cl_2MeSiCHCl_2$, and 2 L of anhydrous THF are mixed in a 5-liter single neck round bottom flask. This mixture is added in parts via the dropping funnel into the Grignard reaction flask over 2 hours. The reaction starts shortly (1-3 minutes) after the silane co-monomers are added. The reaction mixture rapidly warms up to a temperature between approximately 68° C. and approximately 73° C. and develops into a dark brown color. As the reaction progresses, magnesium salts ($MgCl_2$) are formed as solid in the solution. The reaction is maintained at a gentle reflux by cooling the reaction flask with cold water. The exothermic reaction may also be maintained by adjusting the rate of addition of the silane monomers. The resultant mixture is stirred for 30-60 minutes at room temperature, then heated to a temperature of approximately 50° C. and maintained at this temperature for 12 hours with continuous stirring.

200 mL of concentrated HCl is mixed with 5 kg of crushed ice and 1 L of hexane in a 20 L plastic container. This cold hexane/HCl mixture is stirred vigorously by a mechanical stirrer. The reaction mixture from the Grignard reaction is then poured into the rapidly stirred cold hexane/HCl solution over a period of 10 minutes. After the mixture is completely added to the hexane/HCl mixture, the work-up solution is stirred for another 10 minutes. Once the stirring is stopped, a yellow organic phase appears above the aqueous layer. The organic phase is separated and washed with 1 L of dilute (1M) HCl acid and dried over sodium sulfate ($Na_2SO_4$) for 2 hours. The solvents (hexane/THF) are then stripped off by a rotary evaporator to give 342 g of yellow product, which solidifies at room temperature. The resultant polymer with a formula: $[Si(\sim)MeC(\sim)H]_{2n}[SiMe_2CH_2]_n$ was found to have a weight molecular weight (Mw)=4420 and number molecular weight (Mn)=1300. Pyrolysis of the obtained polycarbosilane under nitrogen from room temperature to 1000° C. at 1° C./min gave a black ceramic in 30 to 35% yield.

EXAMPLE 2

One-Step Method for Forming a Type I (Liquid) Copolymer Using 2 Monomers 230 g (9.47 mols) of magnesium (Mg) powder (approximately 50 mesh) and 250 mL of anhydrous THF are placed in the 12-liter three-neck round bottom flask equipped for the Grignard reaction. 572 g (4.0 mols) of $ClMe_2SiCH_2Cl$, is mixed with 396 g (2.0 mols) of (dichloromethyl)methyldichlorosilane and 2 L of anhydrous THF in a 5-liter single neck round bottom flask. This mixture is added in parts via the dropping funnel to the Grignard reaction flask over 2 hours. The reaction starts shortly (1-3 minutes) after the silane co-monomers are added. The reaction mixture rapidly warms up to between approximately 68° C. to approximately 74° C. and developed into a dark brown color. As the reaction progressed, magnesium salts ($MgCl_2$) are formed as solid in the solution. This exothermic reaction is maintained at a gentle reflux by cooling the reaction flask with cold water. The exothermic reaction could also be maintained by adjusting the rate of addition of silane monomers. The resultant mixture is stirred for 30-60 minutes at room temperature, then heated to a temperature of approximately 50° C. and maintained at this temperature for 12 hours with continuous stirring.

100 mL of concentrated HCl is mixed with 3 kg of crushed ice and 1 L of hexane in a 20-liter plastic container. This cold hexane/HCl mixture is stirred vigorously by a mechanical stirrer. The reaction mixture from the Grignard reaction is then poured into the rapidly stirred cold hexane/HCl solution over a period of 10 minutes. After the mixture is completely added to the hexane/HCl mixture, this work-up solution is stirred for another 10 minutes. Once the stirring stopped, a yellow organic phase appeared above the aqueous layer. The organic phase is separated and washed with 1 L of dilute (1M) HCl acid, then dried over sodium sulfate ($Na_2SO_4$) over 2 hours. The solvents (hexane/THF) are stripped off by a rotary evaporator to give 336 g of high viscous liquid of yellow to brown color. The resultant polymer with a formula: $[Si(\sim)MeC(\sim)H]_n[SiMe_2CH_2]_{2n}$ was found to have a weight molecular weight (Mw)=2290 and number molecular weight (Mn)=1140.

EXAMPLE 3

One-Step Method for Forming a Type II (Liquid) Copolymer Using 3 Monomers 206 g (8.48 mols) of magnesium (Mg) powder (approximately 50 mesh) and 200 ml of anhydrous THF were placed in the 12-liter three-neck round bottom flask equipped for the Grignard reaction. 572 g (4 mols) of $ClMe_2SiCH_2Cl$, was mixed with 284 g (1.43 mols) of (dichloromethyl)methyldichlorosilane, 47 g (0.29 mol) of $Cl_2MeSiCH_2Cl$, and 2 L of anhydrous THF in a 5-liter single neck round bottom flask. This mixture was added in parts via the dropping funnel to the Grignard reaction flask within 2 hours. The reaction started shortly (1-3 minutes) after the silane co-monomers are added. The reaction mixture warmed up to between approximately 68° C. to approximately 74° C. and developed into a dark brown color once the reaction started. As the reaction progressed, magnesium salts ($MgCl_2$) are formed as solid in the solution. This exothermic reaction is maintained at a gentle reflux by cooling of the reaction flask with cold water. The exothermic reaction may be adjusted by changing the rate of addition of silane monomers. After the addition of the silane monomers, 25 g (0.33 mol) of allylchloride in 250 ml of THF are charged to continue the Grignard reaction. The temperature in the reaction flask increased to between approximately 68° C. to approximately 74° C. as the reaction from the allylchloride and Mg continued. The allylchloride/THF mixture was charged within 20 minutes. The resultant mixture is stirred for 30-60 minutes at room temperature, then heated to a temperature of approximately 50° C. and maintained at this temperature for 12 hours with continuous stirring.

200 mL of concentrated HCl is mixed with 5 kg of crushed ice and 1 L of hexane in a 20-liter plastic container. This cold hexane/HCl mixture is stirred vigorously by a mechanical stirrer. The reaction mixture from the reduction reaction is then poured into the rapidly stirred cold hexane/HCl solution over a period of 10 minutes. After the mixture is completely added to the hexane/HCl mixture, the work-up solution is stirred for another 10 minutes. Once the stirring stopped, a yellow organic phase appeared above the aqueous layer. The organic phase is separated and washed with 1 L of dilute (1M) HCl acid, then dried over sodium sulfate ($Na_2SO_4$) for 2 hours. The solvents (hexane/THF) are stripped off by a rotary evaporator to give 341 g of viscous yellow liquid. The resultant polymer with a formula: $[Si(\sim)MeC(\sim)H]x_n[SiMe_2CH_2]$ $y_n$[SiMe(Allyl)CH$_2$]$z_n$ was found to have a weight molecular weight (Mw)=3830 and number molecular weight (Mn)=1250

EXAMPLE 4

Two-Step Method for Forming Type II (Liquid) Copolymer (Equations 5 & 6) Using 2 Monomers 288 (11.85 mols) g of magnesium (Mg) powder (approximately 50 mesh) and 300 mL of anhydrous THF are placed in the 12-liter three-neck round bottom flask equipped for the Grignard reaction. 654 g (4 mols) of Cl$_2$MeSiCH$_2$Cl, is mixed with 396 g (2.0 mols) of (dichloromethyl)methyldichlorosilane and 2 L of anhydrous THF in a 5-liter single neck round bottom flask. This mixture is added in parts via the dropping funnel to the Grignard reaction flask within 2 hours. The reaction started shortly (1-3 minutes) after the silane co-monomers are added. The reaction mixture rapidly warmed up to approximately 68° C. to approximately 74° C. and developed into a dark brown color. As the reaction progressed, magnesium salts (MgCl$_2$) are formed as solid in the solution. This exothermic reaction is maintained at a gentle reflux by cooling the reaction flask with cold water. The exothermic reaction could also be maintained by adjusting the rate of addition of silane monomers. After the addition of the silane monomers, 153 g (2.0 mols) of allylchloride in 250 mL of THF are charged to continue the Grignard reaction. The temperature in the reaction flask increased to between approximately 68° C. to approximately 74° C. again as the reaction from the allylchloride and Mg continued. The allylchloride/THF mixture is charged within 20 minutes. The resultant mixture is stirred for 30-60 minutes at room temperature, then heated to a temperature of approximately 50° C. and maintained at this temperature for 12 hours with continuous stirring. At this stage, a chloropolymer with a [Si(~)MeC(~)H]$x_n$[SiMe(Cl)CH$_2$]$y_n$[SiMe(Allyl)CH$_2$]$z_n$ formula was formed.

The reaction flask was immersed in an ice/water bath to cool the reaction mixture. 1 L of anhydrous THF and 30 g (0.79 mol) of LiAlH$_4$ pellets are added to the reaction mixture containing polymers with Si—Cl groups. As the LiAlH$_4$ pellets dissolved gradually, temperature increased due to the exothermic nature of the reduction reaction. The exothermic reduction reaction lasted for approximately 2 hours. When the exothermic reaction is complete, the 12-liter flask is placed under a heating mantle and the reaction mixture is heated to approximately 50° C. The reaction mixture is maintained at this temperature overnight with strong agitation.

400 mL of concentrated HCl is mixed with 5 kg of crushed ice and 1 L of hexane in a 20-liter plastic container. This cold hexane/HCl mixture is stirred vigorously by a mechanical stirrer. The reaction mixture from the reduction reaction is then poured into the rapidly stirred cold hexane/HCl solution over a period of 10 minutes. After the mixture is completely added to the hexane/HCl mixture, the work-up solution is stirred for another 10 minutes. Once the stirring stopped, a yellow organic phase appeared above the aqueous layer. The organic phase is separated and washed with 1 L of dilute (1M) HCl acid, then dried over sodium sulfate (Na$_2$SO$_4$) for 2 hours. The solvents (hexane/THF) are stripped off by a rotary evaporator to give 408 g of viscous yellow liquid. The resultant polymer with a formula: [Si(~)MeC(~)H]$x_n$[SiMe(H)CH$_2$]$y_n$[SiMe(Allyl)CH$_2$]$z_n$ (where x/y/z=1:1:1) is found to have a weight molecular weight (Mw)=3300 and number molecular weight (Mn)=680. Pyrolysis of the obtained polycarbosilane under nitrogen from room temperature to 1000° C. at 1° C./min gave a black ceramic in 25 to 30% yield.

EXAMPLE 5

Two-Step Method for Forming Type II (Liquid) Copolymer Using 3 Monomers 197.5 g (8.13 mols) of magnesium (Mg) powder (approximately 50 mesh) and 200 ml of anhydrous THF are placed in the 12-liter three-neck round bottom flask, forming the Grignard reagent. 572 g (4 mols) of ClMe$_2$SiCH$_2$Cl, and 94 g (0.58 mol) of Cl$_2$MeSiMeCH$_2$Cl are mixed with 227 g (1.15 mols) of (dichloromethyl)methyldichlorosilane and 2 L of anhydrous THF in a 5-liter single neck round bottom flask. This mixture is added in parts via the dropping funnel to the Grignard reaction flask within 2 hours. The reaction started shortly (1-3 minutes) after the silane co-monomers are added. The reaction mixture rapidly warmed up to approximately 68° C. to approximately 74° C. and developed into a dark brown color. As the reaction progressed, magnesium salts (MgCl$_2$) are formed as solid in the solution. This exothermic reaction is maintained at a gentle reflux by cooling of the reaction flask with cold water. The exothermic reaction could also be adjusted by changing the rate of addition of silane monomers. The resultant mixture is stirred for 30-60 minutes at room temperature, then heated to a temperature of approximately 50° C. and maintained at this temperature for 12 hours. The resultant mixture includes the polymer, chloromethylpolycarbosilane with a formula, [Si(~)MeC(~)H]$_{xn}$[SiMe$_2$CH$_2$]$_{yn}$[SiMe(Cl)CH$_2$]$_{zn}$.

The reaction flask is immersed in an ice/water bath to cool the reaction mixture. 1 L of anhydrous THF and 11 g (0.29 mol) of LiAlH$_4$ pellets are added to the reaction mixture containing polymers with Si—Cl groups. As the LiAlH$_4$ pellets dissolved gradually, temperature increased due to the exothermic nature of the reduction reaction. The exothermic reduction reaction may last for approximately 2 hours. When the exothermic reaction is completed, the 12-liter flask is placed under a heating mantle and the reaction mixture is heated to approximately 50° C. The reaction mixture is maintained at this temperature overnight with strong agitation.

300 mL of concentrated HCl is mixed with 5 kg of crushed ice and 1000 mL of hexane in a 20-liter plastic container. This cold hexane/HCl mixture is stirred vigorously by a mechanical stirrer. The reaction mixture from the Grignard reaction is then poured into the rapidly stirred cold hexane/HCl solution over a period of 10 minutes. After the mixture is completely added to the hexane/HCl mixture, this work-up solution is stirred for another 10 minutes. Once the stirring stopped, a yellow organic phase appeared above the aqueous layer. The organic phase is separated and washed with 1 L of dilute (1M) HCl acid, then dried over sodium sulphate (Na$_2$SO$_4$) for 2 hours. The solvents (hexane/THF) are stripped off by a rotary evaporator to give 321 g of high viscous liquid in yellow to brown color. The resultant polymer with a formula: [Si(~)MeC(~)H]$_{xn}$[SiMe$_2$CH$_2$]$_{yn}$[SiMe(H)CH$_2$]$_{zn}$ was found to have molecular weight Mw=2100 and Mn=720.

EXAMPLE 6

Three-Step Method: Partial Methoxylation 3494.5 g (19 mols) of chloromethyltrichlorosilane is placed in the 5-liter three-neck round bottom flask and 1064 g (33.25 mols) of anhydrous methanol was added dropwise over three hours through the dropping funnel while the reaction solution is stirred magnetically by the magnetic stirrer. Nitrogen gas continuously flushed the flask to purge the by-product HCl gas, which is absorbed in the water in the plastic container. When the methanol is completely added, the reaction mixture is stirred for 12 hours at room temperature. The final product from this procedure contains approximately 70% to approximately 75% of (chloromethyl)dimethoxychlorosilane, $Cl(MeO)_2SiCH_2Cl$, approximately 20%-approximately 30% (chloromethyl)dichloromethoxysilane, $Cl_2(MeOSiCH_2Cl$, and approximately 0% to 5% (chloromethyl) trimethoxysilane, $(MeO)_3SiCH_2Cl$. This mixture has an average formula: $Cl_{1.25}(OMe)_{1.75}SiCH_2Cl$ and can be used directly in a following step without purification.

EXAMPLE 7

Three-Step Method: Grignard and Reduction Reaction for Forming Type II (Liquid) Copolymer Using Partially Methoxylated Monomers 372 g (15.31 mols) of Mg powder (or approximately 50 mesh) and 400 mL of anhydrous tetrahydrofuran (THF) are placed in the 12-liter three-neck round bottom flask equipped for the Grignard reaction. 1233 g (7 mols) of the partially methoxylated co-monomer, $Cl_{1.25}(OMe)_{1.75}SiCH_2Cl$, is mixed with 594 g (3 mols) of (dichloromethyl)methyldichlorosilane, 38.5 g (0.5 mols) of allylchloride and 3 L of anhydrous THF in a 12-liter single neck round bottom flask. This mixture is added in parts via the dropping funnel to the Grignard reaction flask over three hours. The reaction started shortly (1-3 minutes) after the silane co-monomers are added. The reaction mixture rapidly warmed up to approximately 68° C. to approximately 74° C. and developed into a dark brown color. As the reaction progressed, magnesium salts ($MgCl_2$) are formed as solid in the solution. This exothermic reaction is maintained at a gentle reflux by cooling of the reaction flask with cold water. The exothermic reaction could also be adjusted by changing the rate of addition of silane monomers. The resultant mixture is stirred for 30-60 minutes at room temperature, then heated to a temperature of approximately 50° C. and maintained at this temperature for 12 hours with continuous stirring. The resultant mixture includes the polymer, allyl-methoxypolycarbosilane with a formula: $[Si(OMe)_2CH_2]_{0.65n}[Si(allyl)(OMe)CH_2]_{0.05n}[SiMeCH]_{0.3n}$.

The reaction flask is immersed in an ice/water bath to cool the reaction mixture. 1.5 L of anhydrous THF and 155 g (4.08 mols) of $LiAlH_4$ pellets are added to the reaction mixture containing polymers with Si—OMe groups. As the $LiAlH_4$ pellets dissolved gradually, temperature increased due to the exothermic nature of the reduction reaction. The exothermic reduction reaction could last for approximately 2 hours. When the exothermic reaction is complete, the 12-liter flask is placed under a heating mantle and the reaction mixture is heated to approximately 50° C. The reaction mixture is maintained at this temperature overnight with strong agitation.

1.5 L of concentrated HCl is mixed with 12 kg of crushed ice and 1.5 L of hexane in a 20-liter plastic container. This cold hexane/HCl mixture is stirred vigorously by a mechanical stirrer. The reaction mixture from the reduction reaction is then poured into the rapidly stirred cold hexane/HCl solution over a period of 10 minutes. After the mixture is completely added to the hexane/HCl mixture, the work-up solution is stirred for another 10 minutes. Once the stirring stopped, a yellow organic phase appeared above the aqueous layer. The organic phase is separated and washed with 1 L of dilute (1M) HCl acid, then dried over sodium sulfate ($Na_2SO_4$) for 2 hours. The solvents (hexane/THF) are stripped off by a rotary evaporator to give 505 g of viscous yellow liquid. The resultant polymer with a formula: $[Si(\sim)MeC(\sim)H]_{0.3n}[SiH_2CH_2]_{0.65n}[SiH(Allyl)CH_2]_{0.05n}$ is found to have a weight molecular weight (Mw)=35570 and number molecular weight (Mn)=1060. Pyrolysis of the obtained polycarbosilane under nitrogen from room temperature to 1000° C. at 1° C./min gave a black ceramic in 68 to 72% yield.

EXAMPLE 8

Three-Step Method for Forming Type I (Solid) Copolymer Using 2 Monomers 250 g (10.29 mols) of magnesium (Mg) powder (approximately 50 mesh) and 250 mL of anhydrous THF are placed in the 12-liter three-neck round bottom flask equipped for the Grignard reaction. 197.4 g (1.12 mols) of $Cl_{1.25}(OMe)_{1.75}SiCH_2Cl$, is mixed with 666 g (3.36 mols) of (dichloromethyl)methyldichlorosilane, and 2 L of anhydrous THF in a 5-liter single neck round bottom flask. This mixture is added in parts via the dropping funnel to the Grignard reaction flask within 2 hours. The reaction started shortly (1-3 minutes) after the silane co-monomers are added. The reaction mixture rapidly warmed up to approximately 68° C. to approximately 74° C. and developed into a dark brown color once the reaction started. As the reaction progressed, magnesium salts ($MgCl_2$) formed as solid in the solution. This exothermic reaction is maintained at a gentle reflux by cooling of the reaction flask with cold water. After the addition of the silane monomers, 86.5 g (1.13 mols) of allylchloride in 300 mL of THF are charged to continue the Grignard reaction. The temperature in the reaction flask increased to between approximately 68° C. to approximately 74° C. again as the reaction from the allylchloride and Mg continued. The allylchloride/THF mixture is charged within 1 hour. The exothermic reaction could also be adjusted by changing the rate of addition of silane monomers. The resultant mixture is stirred for 30-60 minutes at room temperature, then heated to a temperature of approximately 50° C. and maintained at this temperature for 12 hours with stirring. The resultant mixture includes the polymer, allyl-methoxypolycarbosilane with a formula: $[Si(allyl)(OMe)CH_2]_{0.25n}[SiMeCH]_{0.75n}$.

The reaction flask is immersed in an ice/water bath to cool the reaction mixture. 1 L of anhydrous THF and 30 g (0.79 mol) of $LiAlH_4$ pellets are added to the reaction mixture containing the polymer with Si—OMe groups. As the $LiAlH_4$ pellets dissolved gradually, temperature increased because of the exothermic nature of the reduction reaction. The exothermic reduction reaction could last for approximately 2 hours. When the exothermic reaction is complete, the 12-liter flask is placed under a heating mantle and the reaction mixture is heated to approximately 50° C. The reaction mixture is maintained at this temperature overnight with strong agitation.

400 mL of concentrated HCl is mixed with 5 kg of crushed ice and 1 L of hexane in a 20-liter plastic container. This cold hexane/HCl mixture is stirred vigorously by a mechanical stirrer. The reaction mixture from the reduction reaction is then poured into the rapidly stirred cold hexane/HCl solution over a period of 10 minutes. After the mixture is completely added to the hexane/HCl mixture, this work-up solution is stirred for another 10 minutes. Once the stirring is stopped, a yellow organic phase appeared above the aqueous layer. The organic phase is separated and washed with 1 L of dilute (1M) HCl acid, then dried over sodium sulfate ($Na_2SO_4$) for 2 hours. The solvents (hexane/THF) are stripped off by a rotary evaporator to give 286 g of viscous product, which solidified at room temperature. The resultant polymer with a formula:

[Si(~)MeC(~)H]$_{0.75n}$[SiH(Allyl)CH$_2$]$_{0.25n}$ is found to have a weight molecular weight (Mw)=10850 and number molecular weight (Mn)=1320. Pyrolysis of the obtained polycarbosilane under nitrogen from room temperature to 1000° C. at 1° C./min gave a black ceramic in 65 to 72% yield.

EXAMPLE 9

Three-Step Method for Forming Type I (Liquid) Copolymer Using 2 Monomers 346 g (14.24 mols) of magnesium (Mg) powder (approximately 50 mesh) and 350 mL of anhydrous THF are placed in the 12-liter three-neck round bottom flask equipped for the Grignard reaction. 525 g (2.98 mols) of Cl$_{1.25}$(OMe)$_{1.75}$SiCH$_2$Cl, is mixed with 595 g (3 mols) of (dichloromethyl)methyldichlorosilane and 2 L of anhydrous THF in a 5-liter single neck round bottom flask. This mixture is added in parts via the dropping funnel to the Grignard reaction flask within 3 hours. The reaction started shortly (1-3 minutes) after the silane co-monomers are added. The reaction mixture warmed up to approximately 68° C. to approximately 74° C. and developed into a dark brown color. As the reaction progressed, magnesium salts (MgCl$_2$) formed as solid in the solution. This exothermic reaction is maintained at a gentle reflux by cooling of the reaction flask with cold water. The exothermic reaction could also be adjusted by changing the rate of addition of silane monomers. After the addition of the silane monomers, 471 g (3 mols) of bromobenzene in 700 mL of THF are charged to continue the Grignard reaction. The temperature in the reaction flask increased to approximately 68° C. to approximately 74° C. again as the reaction from the bromobenzene and Mg continued. The bromobenzene/THF mixture is charged within 1 hour. The resultant mixture is stirred for 30-60 minutes at room temperature, then heated to a temperature of approximately 50° C. and maintained at this temperature for 12 hours with continuous stirring. The resultant mixture includes the polymer, phenyl-methoxypolycarbosilane with a type I formula: [Si(Ph)(OMe)CH$_2$]$_{0.5n}$[SiMeCH]$_{0.5n}$.

The reaction flask is immersed in an ice/water bath to cool the reaction mixture. 1 L of anhydrous THF and 40 g (1.05 mols) of LiAlH$_4$ pellets are added to the reaction mixture containing the polymer with Si—OMe groups. As the LiAlH$_4$ pellets dissolved gradually, temperature increased because of the exothermic nature of the reduction reaction. The exothermic reduction reaction may last for approximately 2 hours. When the exothermic reaction is complete, the 12-liter flask is placed under a heating mantle and the reaction mixture is heated to approximately 50° C. The reaction mixture is maintained at this temperature overnight with strong agitation.

600 mL of concentrated HCl is mixed with 8 kg of crushed ice and 1 L of hexane in a 20-liter plastic container. This cold hexane/HCl mixture is stirred vigorously by a mechanical stirrer. The reaction mixture from the reduction reaction is then poured into the rapidly stirred cold hexane/HCl solution over a period of 10 minutes. After the mixture is completely added to the hexane/HCl mixture, this work-up solution is stirred for another 10 minutes. Once the stirring is stopped, a yellow organic phase appeared above the aqueous layer. The organic phase is separated and washed with 1 L of dilute (1M) HCl acid, then dried over sodium sulfate (Na$_2$SO$_4$) for 2 hours. The solvents (hexane/THF) are stripped off by a rotary evaporator to give 515 g of very viscous yellow liquid. The resultant polymer with a formula: [Si(~)MeC(~)H]$_{0.5n}$[SiH(Ph)CH$_2$]$_{0.5n}$ is found to have a weight molecular weight (Mw)=2900 and number molecular weight (Mn)=810. Pyrolysis of the obtained polycarbosilane under nitrogen from room temperature to 1000° C. at 1° C./min gave a black ceramic in 65 to 70% yield.

EXAMPLE 10

Three-Step Method for Forming Type I (Solid) Copolymer Using 2 Monomers and NaSCN Catalyst 250 g (10.29 mols) of magnesium (Mg) powder (approximately 50 mesh) and 300 mL of anhydrous THF are placed in the 12-liter three-neck round bottom flask, forming the Grignard reagent. 197.4 g (1.12 mols) of Cl$_{1.25}$(OMe)$_{1.75}$SiCH$_2$Cl, is mixed with 666 g (3.36 mols) of (dichloromethyl)methyldichlorosilane and 1.5 L of anhydrous THF in a 5-liter single neck round bottom flask. This mixture is added in parts via the dropping funnel to the Grignard reaction flask within 2 hours. The reaction started shortly (1-3 minutes) after the silane co-monomers are added. The reaction mixture rapidly warmed up to approximately 68° C. to approximately 74° C. and developed into a dark brown color once the reaction started. As the reaction progressed, magnesium salts (MgCl$_2$) formed as solid in the solution. This exothermic reaction is maintained at a gentle reflux by cooling of the reaction flask with cold water. The exothermic reaction could also be adjusted by changing the rate of addition of silane monomers. After the addition of the silane monomers, 176 g (1.12 mols) of bromobenzene in 400 mL of THF are charged to continue the Grignard reaction. The temperature in the reaction flask increased to approximately 68° C. to approximately 74° C. as the reaction from the bromobenzene and Mg continued. The bromobenzene/THF mixture is charged within 20 minutes. The resultant mixture is stirred for 30-60 minutes at room temperature, then 4 g of NaSCN is added as catalyst. The resultant solution is heated to a temperature of approximately 50° C. and maintained at this temperature for 12 hours with continuous stirring. The resultant mixture includes the polymer, phenyl-methoxypolycarbosilane with a formula: [Si(~)MeC(~)H]$_{0.75n}$[Si(OMe)PhCH$_2$]$_{0.25n}$.

The reaction flask is immersed in an ice/water bath to cool the reaction mixture. 1 L of anhydrous THF and 30 g (0.79 mol) of LiAlH$_4$ pellets are added to the reaction mixture containing the polymer with Si—OMe groups. As the LiAlH$_4$ pellets dissolved gradually, temperature increased because of the exothermic nature of the reduction reaction. The exothermic reduction reaction could last for approximately 2 hours. When the exothermic reaction is complete, the 12-liter flask is placed under a heating mantle and the reaction mixture is heated to approximately 50° C. The reaction mixture is maintained at this temperature overnight with strong agitation.

500 mL of concentrated HCl is mixed with 8 kg of crushed ice and 1 liters of hexane in a 20-liter plastic container. This cold hexane/HCl mixture is stirred vigorously by a mechanical stirrer. The reaction mixture from the reduction reaction is then poured into the rapidly stirred cold hexane/HCl solution over a period of 10 minutes. After the mixture is completely added to the hexane/HCl mixture, this work-up solution is stirred for another 10 minutes. Once the stirring stopped, a yellow organic phase appeared above the aqueous layer. The organic phase is separated and washed with 1 L of dilute (1M) HCl acid, then dried over sodium sulfate (Na$_2$SO$_4$) for 2 hours. The solvents (hexane/THF) are stripped off by a rotary evaporator to give 308 g of yellow product which solidifies at room temperature. The resultant polymer with a formula: [Si(~)MeC(~)H]$_{0.75n}$[Si(H)PhCH$_2$]$_{0.25n}$ is found to have a weight molecular weight (Mw)=9580 and number molecular weight (Mn)=1250. Pyrolysis of the obtained polycarbosilane under nitrogen from room temperature to 1000° C. at 1° C./min gave a black ceramic in 65 to 70% yield.

EXAMPLE 11

Three-Step Method for Forming Type I (Solid) Copolymers Using 2 Monomers 250 g (10.29 mols) of magnesium (Mg) powder (approximately 50 mesh) and 300 mL of anhydrous THF are placed in the 12-liter three-neck round bottom flask, forming the Grignard reagent. 197.4 g (1.12 mols) of $Cl_{1.25}(OMe)_{1.75}SiCH_2Cl$, is mixed with 666 g (3.36 mols) of (dichloromethyl)methyldichlorosilane and 1.5 L of anhydrous THF in a 5-liter single neck round bottom flask. This mixture is added in parts via the dropping funnel to the Grignard reaction flask within 2 hours. The reaction started shortly (1-3 minutes) after the silane co-monomers are added. The reaction mixture rapidly warmed up to approximately 68° C. to approximately 74° C. and developed into a dark brown color once the reaction started. As the reaction progressed, magnesium salts ($MgCl_2$) formed as solid in the solution. This exothermic reaction is maintained at a gentle reflux by cooling of the reaction flask with cold water. The exothermic reaction could also be adjusted by changing the rate of addition of silane monomers. After the addition of the silane monomers, 176 (1.12 mols) g of bromobenzene in 400 mL of THF are charged to continue the Grignard reaction. The temperature in the reaction flask increased to between approximately 68° C. to approximately 74° C. as the reaction from the bromobenzene and Mg continued. The bromobenzene/THF mixture is charged within 20 minutes. The resultant mixture is stirred for 30-60 minutes at room temperature, then heated to a temperature of approximately 50° C. and maintained at this temperature for 12 hours with continuous stirring. The resultant mixture includes the polymer, phenyl-methoxypolycarbosilane with a formula: $[Si(\sim)MeC(\sim)H]_{0.75n}[Si(OMe)PhCH_2]_{0.25n}$.

The reaction flask is immersed in an ice/water bath to cool the reaction mixture. 1 L of anhydrous THF and 30 g (0.79 mol) of $LiAlH_4$ pellets are added to the reaction mixture containing the polymer with Si—OMe groups. As the $LiAlH_4$ pellets dissolved gradually, temperature increased because of the exothermic nature of the reduction reaction. The exothermic reduction reaction could last for approximately 2 hours. When the exothermic reaction is complete, the 12-liter flask is placed under a heating mantle and the reaction mixture is heated to approximately 50° C. The reaction mixture is maintained at this temperature overnight with strong agitation.

Then 500 mL of concentrated HCl is mixed with 8 kg of crushed ice and 1 L of hexane in a 20-liter plastic container. This cold hexane/HCl mixture is stirred vigorously by a mechanical stirrer. The reaction mixture from the reduction reaction is then poured into the rapidly stirred cold hexane/HCl solution over a period of 10 minutes. After the mixture is completely added to the hexane/HCl mixture, this work-up solution is stirred for another 10 minutes. When the stirring stopped, a yellow organic phase appeared above the aqueous layer. The organic phase is separated and washed with 1 L of dilute (1M) HCl acid, then dried over sodium sulfate ($Na_2SO_4$) for 2 hours. The solvents (hexane/THF) are stripped off by a rotary evaporator to give 308 g of product which solidifies at room temperature. The resultant polymer with a formula: $[Si(\sim)MeC(\sim)H]_{0.75n}[Si(H)PhCH_2]_{0.25n}$ is found to have a weight molecular weight (Mw)=10120 and number molecular weight (Mn)=1360. Pyrolysis of the obtained polycarbosilane under nitrogen from room temperature to 1000° C. at 1° C./min gave a black ceramic in 65 to 70% yield.

EXAMPLE 12

Three-Step Method: Grignard and Reduction Reaction for Forming Type II (Liquid) Copolymer Using Partially Methoxylated Monomers 270 g (11.11 mols) of Mg powder (or approximately 50 meshes) and 300 mL of anhydrous tetrahydrofuran (THF) are placed in the 12-liter three-neck round bottom flask equipped for the Grignard reaction. 877 g (5 mols) of the partially methoxylated co-monomer, $Cl_{1.25}(OMe)_{1.75}SiCH_2Cl$, is mixed with 415 g (2.1 mols) of (dichloromethyl)methylmethoxychlorosilane, $Me(OMe)_{0.9}Cl_{1.1}SiCHCl_2$, 27 g (0.35 mol) of allylchloride and 2.2 L of anhydrous THF in a 12-liter single neck round bottom flask. This mixture is added in parts via the dropping funnel to the Grignard reaction flask over three hours. The reaction started shortly (1-3 minutes) after the silane co-monomers are added. The reaction mixture rapidly warmed up to approximately 68° C. to approximately 74° C. and developed into a dark brown color. As the reaction progressed, magnesium salts [$MgCl_2$ and $Mg(OMe)Cl$] formed as solid in the solution. This exothermic reaction is maintained at a gentle reflux by cooling of the reaction flask with cold water. The exothermic reaction could also be adjusted by changing the rate of addition of silane monomers. The resultant mixture is stirred for 30-60 minutes at room temperature, then heated to a temperature of approximately 50° C. and maintained at this temperature for 12 hours with continuous stirring. The resultant mixture includes the polymer, allyl-methoxypolycarbosilane with a formula: $[Si(OMe)_2CH_2]_{0.65n}[Si(allyl)(OMe)CH_2]_{0.05n}[SiMeCH]_{0.3n}$.

The reaction flask is immersed in an ice/water bath to cool the reaction mixture. 1.5 L of anhydrous THF and 105 g (2.77 mols) of $LiAlH_4$ pellets are added to the reaction mixture containing polymers with Si—OMe groups. As the $LiAlH_4$ pellets dissolved gradually, temperature is increased due to the exothermic nature of the reduction reaction. The exothermic reduction reaction could last for approximately 2 hours. When the exothermic reaction is complete, the 12-liter flask is placed under a heating mantle and the reaction mixture is heated to approximately 50° C. The reaction mixture is maintained at this temperature overnight with strong agitation.

1.2 L of concentrated HCl is mixed with 12 kg of crushed ice and 1 L of hexane in a 20-liter plastic container. This cold hexane/HCl mixture is stirred vigorously by a mechanical stirrer. The reaction mixture from the reduction reaction is then poured into the rapidly stirred cold hexane/HCl solution over a period of 10 minutes. After the mixture is completely added to the hexane/HCl mixture, the work-up solution is stirred for another 10 minutes. Once the stirring stopped, a yellow organic phase appeared above the aqueous layer. The organic phase is separated and washed with 1 L of dilute (1M) HCl acid, then dried over sodium sulfate ($Na_2SO_4$) for 2 hours. The solvents (hexane/THF) are stripped off by a rotary evaporator to give 351 g of viscous yellow liquid. The resultant polymer with a formula: $[Si(\sim)MeC(\sim)H]_{0.3n}[SiH_2CH_2]_{0.65n}[SiH(Allyl)CH_2]_{0.05n}$ is found to have a weight molecular weight (Mw)=29500 and number molecular weight (Mn)=870. Pyrolysis of the obtained polycarbosilane under nitrogen from room temperature to 1000° C. at 1° C./min gave a black ceramic in 65 to 70% yield.

EXAMPLE 13

Three-Step Method for Forming Type I (Liquid) Copolymers Using 2 Monomers 250 g (10.29 mols) of magnesium (Mg) powder (approximately 50 mesh) and 250 mL of anhydrous THF are placed in the 12-liter three-neck round bottom flask, forming the Grignard reagent. 197.4 g (1.12 mols) of $Cl_{1.25}(OMe)_{1.75}SiCH_2Cl$, is mixed with 650 g (3.36 mols) of $Me(OMe)_{0.9}Cl_{1.1}SiCHCl_2$ and 1.5 L of anhydrous THF in a 5-liter single neck round bottom flask. This mixture is added in parts via the dropping funnel to the Grignard reaction flask within 2 hours. The reaction started shortly (1-3 minutes) after the silane co-monomers are added. The reaction mixture rapidly warmed up to approximately 68° C. to approximately 74° C. and developed into a dark brown color once the reaction started. As the reaction progressed, magnesium salts [$MgCl_2$ and Mg(OMe)Cl] formed as solid in the solution. This exothermic reaction is maintained at a gentle reflux by cooling of the reaction flask with cold water. The exothermic reaction could also be adjusted by changing the rate of addition of silane monomers. After the addition of the silane monomers, 176 g (1.12 mols) of bromobenzene in 400 mL of THF are charged to continue the Grignard reaction. The temperature in the reaction flask increased to between approximately 68° C. to approximately 74° C. as the reaction from the bromobenzene and Mg continued. The bromobenzene/THF mixture is charged within 20 minutes. The resultant mixture is stirred for 30-60 minutes at room temperature, then heated to a temperature of approximately 50° C. and maintained at this temperature for 12 hours with continuous stirring. The resultant mixture includes the polymer, phenyl-methoxypolycarbosilane with a formula: $[Si(\sim)MeC(\sim)H]_{0.75n}[Si(OMe)PhCH_2]_{0.25n}$.

The reaction flask was immersed in an ice/water bath to cool the reaction mixture. 1 L of anhydrous THF and 30 g (0.79 mol) of $LiAlH_4$ pellets are added to the reaction mixture containing the polymer with Si—OMe groups. As the $LiAlH_4$ pellets dissolved gradually, temperature increased because of the exothermic nature of the reduction reaction. The exothermic reduction reaction could last for approximately 2 hours. When the exothermic reaction is complete, the 12-liter flask is placed under a heating mantle and the reaction mixture is heated to approximately 50° C. The reaction mixture is maintained at this temperature overnight with strong agitation.

500 mL of concentrated HCl is mixed with 8 kg of crushed ice and 1 L of hexane in a 20-liter plastic container. This cold hexane/HCl mixture is stirred vigorously by a mechanical stirrer. The reaction mixture from the reduction reaction is then poured into the rapidly stirred cold hexane/HCl solution over a period of 10 minutes. Once the mixture is completely added to the hexane/HCl mixture, this work-up solution is stirred for another 10 minutes. When the stirring stopped, a yellow organic phase appeared above the aqueous layer. The organic phase is separated and washed with 1000 ml of dilute (1M) HCl acid, then dried over sodium sulfate ($Na_2SO_4$) for 2 hours. The solvents (hexane/THF) are stripped off by a rotary evaporator to give 310 g of very viscous yellow liquid. The resultant copolymer with a formula: $[Si(\sim)MeC(\sim)H]_{0.75n}[Si(H)PhCH_2]_{0.25n}$ is found to have a weight molecular weight (Mw)=8600 and number molecular weight (Mn)=970. Pyrolysis of the obtained polycarbosilane under nitrogen from room temperature to 1000° C. at 1° C./min gave a black ceramic in 68 to 72% yield.

EXAMPLE 14

Three-Step Method for Forming Type I (Liquid) Copolymer Using 2 Monomers 250 g (10.29 mols) of magnesium (Mg) powder (approximately 50 mesh), 20 g (0.31 mol) of zinc (Zn) powder and 250 mL of anhydrous THF are placed in the 12-liter three-neck round bottom flask, forming the Grignard reagent. 197.4 g (1.12 mols) of $Cl_{1.25}(OMe)_{1.75}SiCH_2Cl$, is mixed with 650 g (3.36 mols) of $Me(OMe)_{0.9}Cl_{1.1}SiCHCl_2$ and 1.5 L of anhydrous THF in a 5-liter single neck round bottom flask. This mixture is added in parts via the dropping funnel to the Grignard reaction flask within 2 hours. The reaction started shortly (1-3 minutes) after the silane co-monomers are added. The reaction mixture rapidly warmed up to approximately 68° C. to approximately 74° C. and developed into a dark brown color once the reaction started. As the reaction progressed, magnesium salts [$MgCl_2$ and Mg(OMe)Cl] formed as solid in the solution. This exothermic reaction is maintained at a gentle reflux by cooling of the reaction flask with cold water. The exothermic reaction could also be adjusted by changing the rate of addition of silane monomers. After the addition of the silane monomers, 176 g (1.12 mols) of bromobenzene in 400 mL of THF are charged to continue the Grignard reaction. The temperature in the reaction flask increased to approximately 68° C. to approximately 74° C. as the reaction from the bromobenzene and Mg continued. The bromobenzene/THF mixture is charged within 20 minutes. The resultant mixture is stirred for 30-60 minutes at room temperature, then heated to a temperature of approximately 50° C. and maintained at this temperature for 12 hours with continuous stirring. The resultant mixture includes the copolymer, phenyl-methoxypolycarbosilane with a formula: $[Si(\sim)MeC(\sim)H]_{0.75n}[Si(OMe)PhCH_2]_{0.25n}$.

The reaction flask is immersed in an ice/water bath to cool the reaction mixture. 1 L of anhydrous THF and 30 g (0.79 mol) of $LiAlH_4$ pellets are added to the reaction mixture containing the polymer with Si—OMe groups. As the $LiAlH_4$ pellets dissolved gradually, temperature increased because of the exothermic nature of the reduction reaction. The exothermic reduction reaction could last for approximately 2 hours. When the exothermic reaction is complete, the 12-liter flask is placed under a heating mantle and the reaction mixture is heated to approximately 50° C. The reaction mixture is maintained at this temperature overnight with strong agitation.

500 mL of concentrated HCl is mixed with 8 kg of crushed ice and 1 L of hexane in a 20-liter plastic container. This cold hexane/HCl mixture is stirred vigorously by a mechanical stirrer. The reaction mixture from the reduction reaction is then poured into the rapidly stirred cold hexane/HCl solution over a period of 10 minutes. After the mixture is completely added to the hexane/HCl mixture, this work-up solution is stirred for another 10 minutes. Once the stirring is stopped, a yellow organic phase appeared above the aqueous layer. The organic phase is separated and washed with 1 L of dilute (1M) HCl acid, then dried over sodium sulfate ($Na_2SO_4$) for 2 hours. The solvents (hexane/THF) are stripped off by a rotary evaporator to give 307 g of very viscous yellow liquid. The resultant copolymer with a formula: $[Si(\sim)MeC(\sim)H]_{0.75n}[Si(H)PhCH_2]_{0.25n}$ is found to have a weight molecular weight (Mw)=7120 and number molecular weight (Mn)=930. Pyrolysis of the obtained polycarbosilane under nitrogen from room temperature to 1000° C. at 1° C./min gave a black ceramic in 70% to 75% yield.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A polycarbosilane, having a general formula:

$$[Si(\sim)RC(\sim)H]_{xn}[SiR_1R_2CH_2]_{yn},$$

where n is the degree of polymerization, ~ represents a branched chain, $0.1 \leq x < 0.8$, $0.2 \leq y < 0.9$ and $x+y=1$, wherein R is selected from a group consisting of: a methyl (Me) and hydrogen (H), wherein each of $R_1$ and $R_2$ are independently selected from a group consisting of: allyl, hydrogen (H), methyl (Me), phenyl (ph), propargyl and vinyl.

2. The polycarbosilane of claim 1, wherein $R_1$ and $R_2$ are the same.

3. A polycarbosilane, having a general formula:

$$[Si(\sim)RC(\sim)H]_{xn}[SiR_1R_2CH_2]_{yn}[SiR_3R_4CH_2]_{zn}$$

where n is the degree of polymerization, ~ represents branched chain, $0.1 \leq x < 0.8$, $0 \leq y < 0.8$, $0.2 \leq z < 0.8$ and $x+y+z=1$, wherein R is selected from a group consisting of: hydrogen (H) and methyl (Me), wherein each of $R_1$ and $R_2$ are independently selected from a group consisting of: hydrogen (H), methyl (Me), and phenyl (ph) and wherein each of $R_3$ and $R_4$ are independently selected from a group consisting of: hydrogen, allyl, methyl, phenyl (ph), a propargyl and vinyl.

4. The polycarbosilane of claim 3, wherein $R_1$ and $R_2$ are the same.

5. The polycarbosilane of claim 3, wherein $R_3$ and $R_4$ are the same.

6. A method for preparing a carbosilane copolymer having a general formula:

$$[Si(\sim)RC(\sim)H]_{xn}[SiR_1R_2CH_2]_{yn},$$

where n is the degree of polymerization,
~ represents branched chain,
$0.1 \leq x < 0.8$, $0.2 \leq y < 0.9$ and $x+y=1$,
wherein R is selected from a group consisting of hydrogen (H) and methyl (Me),
wherein $R_1$ and $R_2$ are selected from a group consisting of hydrogen (H), allyl, methyl (Me), phenyl (Ph), propargyl or vinyl, the method comprising: a one-step Grignard reaction in an
organic solvent between halocarbosilane co-monomers in the presence of magnesium,
wherein the co-monomers have a general formula:

$$X_pSi(R_3)_qCH_rX_s$$

where X is a halogen, $R_3$ is a hydrogen atom or a monovalent hydrocarbon, $1 \leq p \leq 3$, $1 \leq q \leq 2$, $1 \leq r \leq 2$ and $1 s \leq 2$.

7. The method according to claim 6, wherein X is chlorine.

8. The method according to claim 6, wherein R is methyl.

9. The method according to claim 6, wherein the organic solvent is tetrahydrofuran.

10. The method according to claim 6, wherein a catalyst is added to the Grignard reaction, the catalyst being selected from a group consisting of zinc, NaSCN and CuCN.

11. The method according to claim 6, wherein the Grignard reaction is carried out at a temperature between about 68° C. and about 74° C.

12. A method for preparing a carbosilane copolymer having a general formula:

$$([Si(\sim)RC(\sim)H]_{xn}[SiR_1R_2CH_2]_{yn}[SiR_3R_4CH_2]_{zn}$$

where n is the degree of polymerization,
~ represents branched chain,
$0.1 \leq x < 0.8$, $0 \leq y \leq 0.8$, $0.2 \leq z < 0.8$ and $x+y+z=1$,
wherein R is selected from a group consisting of: hydrogen (H) and methyl (Me), wherein $R_1$ and $R_2$ are selected from the group consisting of hydrogen (H), methyl (Me), or phenyl (Ph), wherein $R_3$ and $R_4$ are selected from the group consisting of hydrogen (H), allyl, methyl (Me), phenyl (Ph), propargyl or vinyl, the method comprising: a one-step Grignard reaction in an organic solvent between halocarbosilane co-monomers in the presence of magnesium, wherein the co-monomers have a general formula:

$$X_pSi(R_5)_qCH_rX_s$$

where X is a halogen, $R_5$ is a hydrogen atom or a monovalent hydrocarbon, $1 \leq p \leq 3$, $1 \leq q \leq 2$, $1 \leq r \leq 2$ and $1 \leq s \leq 2$.

13. The method according to claim 12, wherein X is chlorine.

14. The method according to claim 12, wherein R is methyl.

15. The method of claim 12, wherein the organic solvent is tetrahydrofuran.

16. The method according to claim 12, wherein a catalyst is added to the Grignard reaction, the catalyst being selected from a group consisting of zinc, NaSCN and CuCN.

17. The method according to claim 12, wherein the Grignard reaction is carried out at a temperature between about 68° C. and about 74° C.

18. A method for preparing a copolymer carbosilane having a general formula:

$$[Si(\sim)RC(\sim)H]_{xn}[SiR_1R_2CH_2]_{yn},$$

where n is the degree of polymerization, ~represents branched chain $0.1 \leq x < 0.8$, $0.2 \leq y < 0.9$ and $x+y=1$, wherein R is selected from a group consisting of: a methyl (Me) and hydrogen (H), wherein each of $R_1$ and $R_2$ is independently selected from a group consisting of: allyl, hydrogen (H), methyl (Me), phenyl (ph), propargyl and vinyl, the method comprising: a Grignard reaction between halocarbosilanes co-monomers and a reduction reaction to replace a functional group in a resulting copolymer, the halocarbosilane co-monomers having a general formula:

$$X_pSi(R_3)_qCH_rX_s$$

where X is a halogen, $R_3$ is a hydrogen atom or a monovalent hydrocarbon, $1 \leq p \leq 3$, $1 \leq q \leq 2$, $1 \leq r \leq 2$ and $1 \leq s \leq 2$.

19. The method according to claim 18, wherein the functional group is selected from a group consisting of halogens and methoxy groups.

20. The method according to claim 18, wherein a catalyst is added to the Grignard reaction, the catalyst being selected from a group consisting of zinc, NaSCN and CuCN.

21. The method according to claim 18, wherein the Grignard reaction is carried out at a temperature between about 68° C. and about 74° C.

22. The method according to claim 18, wherein the reduction reaction is carried out at a temperature between about 50° C. and about 70° C.

23. A method for preparing a copolymer carbosilane having a general formula as $$[Si(\sim)RC(\sim)H]_{xn}[SiR_1R_2CH_2]_{yn}[SiR_3R_4CH_2]_{zn}$$

where n is the degree of polymerization, ~ represents branched chain $0.1 \leq x \leq 0.8$, $0 \leq y < 0.8$, $0.2 \leq z < 0.8$ and x+y+z=1, wherein R is selected from a group consisting of: hydrogen (H), and methyl (Me), wherein $R_1$ and $R_2$ are selected from the group consisting of hydrogen (H), methyl (Me), or phenyl (Ph), wherein $R_3$ and $R_4$ are selected from the group consisting of hydrogen (H), allyl, methyl (Me), phenyl (Ph), propargyl or vinyl, the method comprising: a Grignard reaction between halocarbosilanes co-monomers and a reduction reaction to replace a functional group in a resulting copolymer, the halocarbosilane co-monomers having a general formula:

$$X_p Si(R_5)_q CH_r X_s$$

where X is a halogen, $R_5$ is a hydrogen atom or a monovalent hydrocarbon, $1 \leq p \leq 3$, $1 \leq q \leq 2$, $1 \leq r \leq 2$ and $1 \leq s \leq 2$.

24. The method according to claim 23, wherein the functional group is selected from a group consisting of halogens and methoxy groups.

25. The method according to claim 23, wherein a catalyst is added to the Grignard reaction, the catalyst being selected from a group consisting of zinc, NaSCN and CuCN.

26. The method according to claim 23, wherein the Grignard reaction is carried out at a temperature between about 6820° C. and about 74° C.

27. The method according to claim 23, wherein the reduction reaction is carried out at a temperature between about 50° C. and about 70° C.

28. A method for preparing a polycarbosilane having a general formula:

$$[Si(\sim)RC(\sim)H]_{xn}[SiR_1R_2CH_2]_{yn},$$

where n is the degree of polymerization,
~ represents branched chain, $0.1 \leq x < 0.8$, $0.2 \leq y < 0.9$ and x+y=1, wherein R is selected from a group consisting of hydrogen (H) and methyl (Me), wherein $R_1$ and $R_2$ are selected from a group consisting of hydrogen (H), allyl, methyl (Me), phenyl (Ph), propargyl or vinyl, the method comprising a partial methoxylation of a trihalocarbosilane, a Grignard reaction of the partially methoxylated trihalocarbosilane and a reduction of the partially methoxylated trihalocarbosilane.

29. The method according to claim 28, wherein the partially methoxylated trihalocarbosilane has two general formula: $Cl_{3-m}(OMe)_m SiCH_2 Cl$, where $1.5 \leq m \leq 2.5$, and $(OMe)_p Cl_{2-p} SiCHCl_2$, where $0 < p \leq 1$.

30. The method according to claim 28, wherein a catalyst is added to the Grignard reaction, the catalyst being selected from a group consisting of zinc, NaSCN and CuCN.

31. The method according to claim 28, wherein the Grignard reaction is carried out at a temperature between about 68° C. and about 74° C.

32. The method according to claim 28, wherein the reduction reaction is carried out at a temperature between about 50° C. and about 70° C.

33. A method for preparing a polycarbosilane having a general formula:

$$[Si(\sim)RC(\sim)H]_{xn}[SiR_1R_2CH_2]_{yn}[SiR_3R_4CH_2]_{zn}$$

where n is the degree of polymerization,
~ represents branched chain,
$0.1 \leq x < 0.8$, $0 \leq y < 0.8$, $0.2 \leq z < 0.8$ and x+y+z=1, wherein R is selected from a group consisting of: hydrogen (H), and methyl (Me), wherein $R_1$ and $R_2$ are selected from the group consisting of hydrogen (H), methyl (Me), or phenyl (Ph), wherein $R_3$ and $R_4$ are selected from the group consisting of hydrogen (H), allyl, methyl (Me), phenyl (Ph), propargyl or vinyl, the method comprising a partial methoxylation of a trihalocarbosilane, a Grignard reaction of the partially methoxylated trihalocarbosilane and a reduction of the partially methoxylated trihalocarbosilane.

34. The method according to claim 33, wherein the partially methoxylated trihalocarbosilane includes the general formula: $Cl_{3-m}(OMe)_m SiCH_2 Cl$, where $1.5 \leq m \leq 2.5$, and $(OMe)_p Cl_{2-p} SiCHCl_2$, where $0 < p \leq 1$.

35. The method according to claim 33, wherein a catalyst is added to the Grignard reaction, the catalyst being selected from a group consisting of zinc, NaSCN and CuCN.

36. The method according to claim 33, wherein the Grignard reaction is carried out at a temperature between about 68° C. and about 74° C.

37. The method according to claim 33, wherein the reduction reaction is carried out at a temperature between about 50° C. and about 70° C.

* * * * *

UNITED STATES PATENT AND TRADEMARK OFFICE
CERTIFICATE OF CORRECTION

PATENT NO. : 7,714,092 B2  Page 1 of 1
APPLICATION NO. : 11/612890
DATED : May 11, 2010
INVENTOR(S) : Qiongshua Shen It is certified that error appears in the above-identified patent and that said Letters Patent is hereby corrected as shown below:

Claim 26, line 25, "6820 C." should be changed to --68° C.--

Signed and Sealed this

Twenty-fourth Day of August, 2010

David J. Kappos
*Director of the United States Patent and Trademark Office*

UNITED STATES PATENT AND TRADEMARK OFFICE
CERTIFICATE OF CORRECTION

PATENT NO.       : 7,714,092 B2                                    Page 1 of 1
APPLICATION NO.  : 11/612890
DATED            : May 11, 2010
INVENTOR(S)      : Qiongshua Shen It is certified that error appears in the above-identified patent and that said Letters Patent is hereby corrected as shown below:

Claim 26, Column 23, line 25, "6820 C." should be changed to --68° C.--

This certificate supersedes the Certificate of Correction issued August 24, 2010.

Signed and Sealed this

Twenty-eighth Day of September, 2010

David J. Kappos
*Director of the United States Patent and Trademark Office*